United States Patent
Potnis

(10) Patent No.: US 11,620,522 B2
(45) Date of Patent: Apr. 4, 2023

(54) VEHICULAR SYSTEM FOR TESTING PERFORMANCE OF HEADLAMP DETECTION SYSTEMS

(71) Applicant: Magna Electronics Inc., Auburn Hills, MI (US)

(72) Inventor: Anuj S. Potnis, Hösbach (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 352 days.

(21) Appl. No.: 17/247,879

(22) Filed: Dec. 29, 2020

(65) Prior Publication Data

US 2021/0201085 A1 Jul. 1, 2021

Related U.S. Application Data

(60) Provisional application No. 62/955,548, filed on Dec. 31, 2019.

(51) Int. Cl.
*G06N 3/08* (2023.01)
*G06T 7/70* (2017.01)
(Continued)

(52) U.S. Cl.
CPC ............ *G06N 3/08* (2013.01); *B60Q 1/1423* (2013.01); *G06F 16/40* (2019.01); *G06F 18/214* (2023.01); *G06F 18/217* (2023.01); *G06F 18/24* (2023.01); *G06N 3/045* (2023.01); *G06N 3/088* (2013.01); *G06T 7/70* (2017.01); *G06V 10/25* (2022.01); *G06V 10/764* (2022.01); *G06V 10/774* (2022.01); *G06V 10/82* (2022.01); *G06V 20/584* (2022.01); *G06T 2207/20081* (2013.01);
(Continued)

(58) Field of Classification Search
CPC .......... G06N 3/08; G06N 3/045; G06N 3/088; G06N 3/047; G06N 3/084; B60Q 1/1423; G06F 16/40; G06F 18/214; G06F 18/217; G06F 18/24; G06T 7/70; G06T 2207/20081; G06T 2207/20084; G06T 2207/30252; G06T 2207/10024; G06T 2207/10016; G06V 10/25; G06V 10/764; G06V 10/774; G06V 10/82; G06V 20/584; G06V 20/56; G06V 20/58; G06V 10/255; B60R 1/00; B60R 2300/802; B60R 11/04; B60R 2300/8066; B60W 50/14; B60W 2420/42
See application file for complete search history.

(56) References Cited

U.S. PATENT DOCUMENTS 5,448,484 A 9/1995 Bullock et al.
5,541,590 A 7/1996 Nishio
(Continued)

*Primary Examiner* — Michael S Osinski
(74) *Attorney, Agent, or Firm* — Honigman LLP

(57) ABSTRACT

A method for testing a vehicular driving assist system includes providing a neural network and training the neural network using a database of images, with each image of the database of images including an image of a headlight or a taillight of a vehicle. The trained neural network is provided with an input image that does not include a headlight or a taillight. The neural network, using the input image, generates an output image, with the output image including an image of a headlight or taillight generated by the neural network. The output image is provided as an input to the driving assist system to test the driving assist system.

20 Claims, 3 Drawing Sheets

(51) Int. Cl.
    *G06F 16/40*             (2019.01)
    *B60Q 1/14*              (2006.01)
    *G06N 3/088*            (2023.01)
    *G06V 20/58*            (2022.01)
    *G06F 18/21*             (2023.01)
    *G06F 18/24*             (2023.01)
    *G06F 18/214*           (2023.01)
    *G06N 3/045*            (2023.01)
    *G06V 10/25*            (2022.01)
    *G06V 10/764*           (2022.01)
    *G06V 10/774*           (2022.01)
    *G06V 10/82*            (2022.01)

(52) U.S. Cl.
    CPC .............. *G06T 2207/20084* (2013.01); *G06T 2207/30252* (2013.01)

(56) References Cited

U.S. PATENT DOCUMENTS

| | | | |
|---|---|---|---|
| 5,550,677 A | 8/1996 | Schofield et al. | |
| 5,670,935 A | 9/1997 | Schofield et al. | |
| 5,796,094 A | 8/1998 | Schofield et al. | |
| 5,949,331 A | 9/1999 | Schofield et al. | |
| 6,396,408 B2 | 5/2002 | Drummond et al. | |
| 6,485,081 B1 | 11/2002 | Bingle et al. | |
| 7,038,577 B2 | 5/2006 | Pawlicki et al. | |
| 7,720,580 B2 | 5/2010 | Higgins-Luthman | |
| 7,855,755 B2 | 12/2010 | Weller et al. | |
| 8,258,932 B2 | 9/2012 | Wahlstrom | |
| 8,373,581 B2 | 2/2013 | Hassan et al. | |
| 9,117,123 B2 | 8/2015 | Nix | |
| 9,180,908 B2 | 11/2015 | Van Dan Elzen et al. | |
| 9,445,057 B2 | 9/2016 | May et al. | |
| 10,328,932 B2 | 6/2019 | Gieseke et al. | |
| 10,423,843 B2 * | 9/2019 | Biemer | G06V 20/582 |
| 10,635,915 B1 * | 4/2020 | Kim | B60R 1/00 |
| 10,853,671 B2 * | 12/2020 | Mansour | G06N 3/045 |
| 10,861,189 B2 | 12/2020 | Potnis | |
| 10,933,798 B2 * | 3/2021 | Juette | H04N 7/183 |
| 11,034,295 B2 * | 6/2021 | Diessner | H04N 7/181 |
| 11,299,169 B2 * | 4/2022 | Chakravarty | G06N 3/047 |
| 11,347,974 B2 * | 5/2022 | Charugundla Gangadhar | G06F 18/214 |
| 2005/0271254 A1 * | 12/2005 | Hougen | G06F 18/28 382/104 |
| 2015/0296135 A1 | 10/2015 | Wacquant et al. | |
| 2015/0343951 A1 * | 12/2015 | Kim | G07C 5/02 701/42 |
| 2016/0137126 A1 | 5/2016 | Fursich et al. | |
| 2016/0267333 A1 * | 9/2016 | Jung | B60R 1/00 |
| 2017/0228606 A1 * | 8/2017 | Guan | G06T 7/90 |
| 2018/0330608 A1 * | 11/2018 | Koravadi | G08G 1/096716 |
| 2018/0349678 A1 | 12/2018 | Koskan | |
| 2018/0370527 A1 * | 12/2018 | Rachor | B60W 30/18163 |
| 2019/0087672 A1 * | 3/2019 | Wang | G06V 10/774 |
| 2019/0149425 A1 | 5/2019 | Larish | |
| 2019/0152379 A1 * | 5/2019 | Biswal | B60Q 1/085 |
| 2019/0155284 A1 | 5/2019 | Zavesky | |
| 2019/0176684 A1 * | 6/2019 | Zych | G06V 20/58 |
| 2019/0271550 A1 | 9/2019 | Breed | |
| 2019/0278994 A1 * | 9/2019 | Bumpas | G06F 16/55 |
| 2019/0318490 A1 * | 10/2019 | Andelic | G06F 18/211 |
| 2019/0329778 A1 * | 10/2019 | D'sa | B60W 30/18163 |
| 2019/0370574 A1 * | 12/2019 | Wang | G06N 3/045 |
| 2020/0005637 A1 * | 1/2020 | Walker | G06F 3/04817 |
| 2020/0079368 A1 * | 3/2020 | Yamada | B60W 50/14 |
| 2020/0090366 A1 * | 3/2020 | Korjus | G01S 13/881 |
| 2020/0134333 A1 * | 4/2020 | Vishal | G06F 18/2451 |
| 2020/0184654 A1 * | 6/2020 | Kim | G06T 7/74 |
| 2020/0285869 A1 * | 9/2020 | Mansour | G06F 18/2431 |
| 2021/0070286 A1 * | 3/2021 | Green | G05D 1/0088 |
| 2021/0326613 A1 * | 10/2021 | Zhou | G08G 1/017 |
| 2021/0390353 A1 * | 12/2021 | Futatsugi | G06V 10/87 |
| 2022/0076038 A1 * | 3/2022 | Chen | G06V 20/584 |
| 2022/0095434 A1 * | 3/2022 | Li | H05B 47/105 |
| 2022/0130153 A1 * | 4/2022 | Wang | G06V 20/584 |
| 2022/0144302 A1 * | 5/2022 | Takei | G06V 20/597 |
| 2022/0161713 A1 * | 5/2022 | Persson | G06V 10/82 |
| 2022/0266855 A1 * | 8/2022 | He | G06V 20/584 |
| 2022/0270285 A1 * | 8/2022 | Jang | G08G 1/161 |
| 2022/0284222 A1 * | 9/2022 | Pan | G06V 20/56 |
| 2022/0350155 A1 * | 11/2022 | Nakabayashi | G02B 27/0179 |
| 2022/0358620 A1 * | 11/2022 | Watanabe | G06T 3/4038 |
| 2022/0383570 A1 * | 12/2022 | Ling | G06T 7/11 |
| 2022/0414388 A1 * | 12/2022 | Fang | G01S 17/89 |
| 2023/0022921 A1 * | 1/2023 | Lim | A61B 3/117 |

* cited by examiner

VEHICULAR SYSTEM FOR TESTING PERFORMANCE OF HEADLAMP DETECTION SYSTEMS

CROSS REFERENCE TO RELATED APPLICATION

The present application claims the filing benefits of U.S. provisional application Ser. No. 62/955,548, filed Dec. 31, 2019, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,796,094; 5,670,935 and/or 5,550,677, which are hereby incorporated herein by reference in their entireties.

SUMMARY OF THE INVENTION

The present invention provides a method for testing a vehicular driving assistance system or vision system or imaging system that utilizes one or more cameras to capture image data representative of a field of view exterior of the vehicle. The method includes providing a neural network and training the neural network using a database of images. Each image of the database of images includes a headlight or a taillight of a vehicle. The method also includes providing to the trained neural network an input image that does not include a headlight or a taillight and generating, by the neural network, using the input image, an output image. The output image includes a headlight or taillight generated by the neural network. The method also includes providing the output image as an input to the driving assist system to test the driving assist system.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a display, such as a rearview display or a top down or bird's eye or surround view display or the like.

Figure 1:
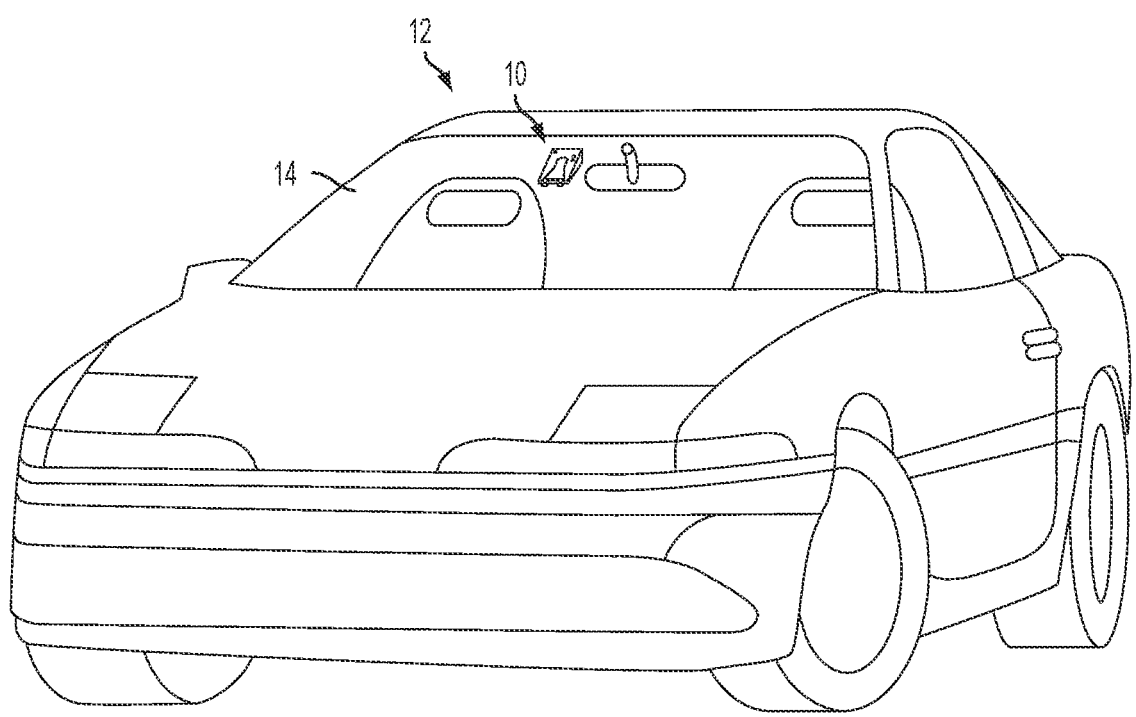
FIG. 1 is a plan view of a vehicle with a vision system that incorporates cameras in accordance with the present invention.

Referring now to the drawings and the illustrative embodiments depicted therein, a vision system or driving assist system 10 for a vehicle 12 includes at least one exterior viewing imaging sensor or camera, such as a forward viewing imaging sensor or camera, which may be disposed at and behind the windshield 14 of the vehicle and viewing forward through the windshield 14 so as to capture image data representative of the scene occurring forward of the vehicle 12 (FIG. 1). Optionally, the system may include multiple exterior viewing imaging sensors or cameras, such as a forward viewing camera at the front of the vehicle, and a sideward/rearward viewing camera at respective sides of the vehicle, and a rearward viewing camera at the rear of the vehicle, which capture images exterior of the vehicle. The camera or cameras each include a lens for focusing images at or onto an imaging array or imaging plane or imager of the camera. The forward viewing camera disposed at the windshield of the vehicle views through the windshield and forward of the vehicle, such as for a machine vision system (such as for traffic sign recognition, headlamp control, pedestrian detection, collision avoidance, lane marker detection and/or the like). The vision system 10 includes a control or electronic control unit (ECU) having electronic circuitry and associated software, with the electronic circuitry including a data processor or image processor that is operable to process image data captured by the camera or cameras, whereby the ECU may detect or determine presence of objects or the like and/or the system may provide displayed images at a display device for viewing by the driver of the vehicle. The data transfer or signal communication from the camera to the ECU may comprise any suitable data or communication link, such as a vehicle network bus or the like of the equipped vehicle.

Modern vehicles often use vehicular vision systems (e.g., camera systems) to detect and identify or recognize objects. For example, the vehicle may identify headlights and/or tail lights of vehicles for many advanced driving assistance systems (ADAS) (e.g., adaptive cruise control (ACC), autonomous emergency braking (AEB), automatic high beams, etc.). The vision system may provide a light type and position to the various ADAS modules, for example to switch from high beams to low beams.

To test functionality of such ADAS modules, typically a large amount of data is collected at various speeds, distances, weather conditions, orientations, and angles of approach of the object or headlight and/or tail light to be identified as oncoming targets, preceding targets, etc. relative to the ADAS module undergoing functionality testing. Additionally, when testing on a test track, an accurate GPS or similar system is used to precisely track the vehicle's position (i.e., provide a precise ground truth). However, this testing incurs heavy costs, considerable time, and is limited in the number of combinations of test variations.

Aspects of the present invention include a driving assistance test system that uses artificial intelligence and image processing techniques to modify images captured by a camera to emulate the effect of various headlights or tail lights. For example, using machine learning, such as neural networks (e.g., Generative Adversarial Networks (GAN)), the emulated effect is realistic enough to use as a real world scenario for the ADAS module under test. The vehicular vision system may use these generated images and videos to test the ADAS algorithm.

Figure 2:
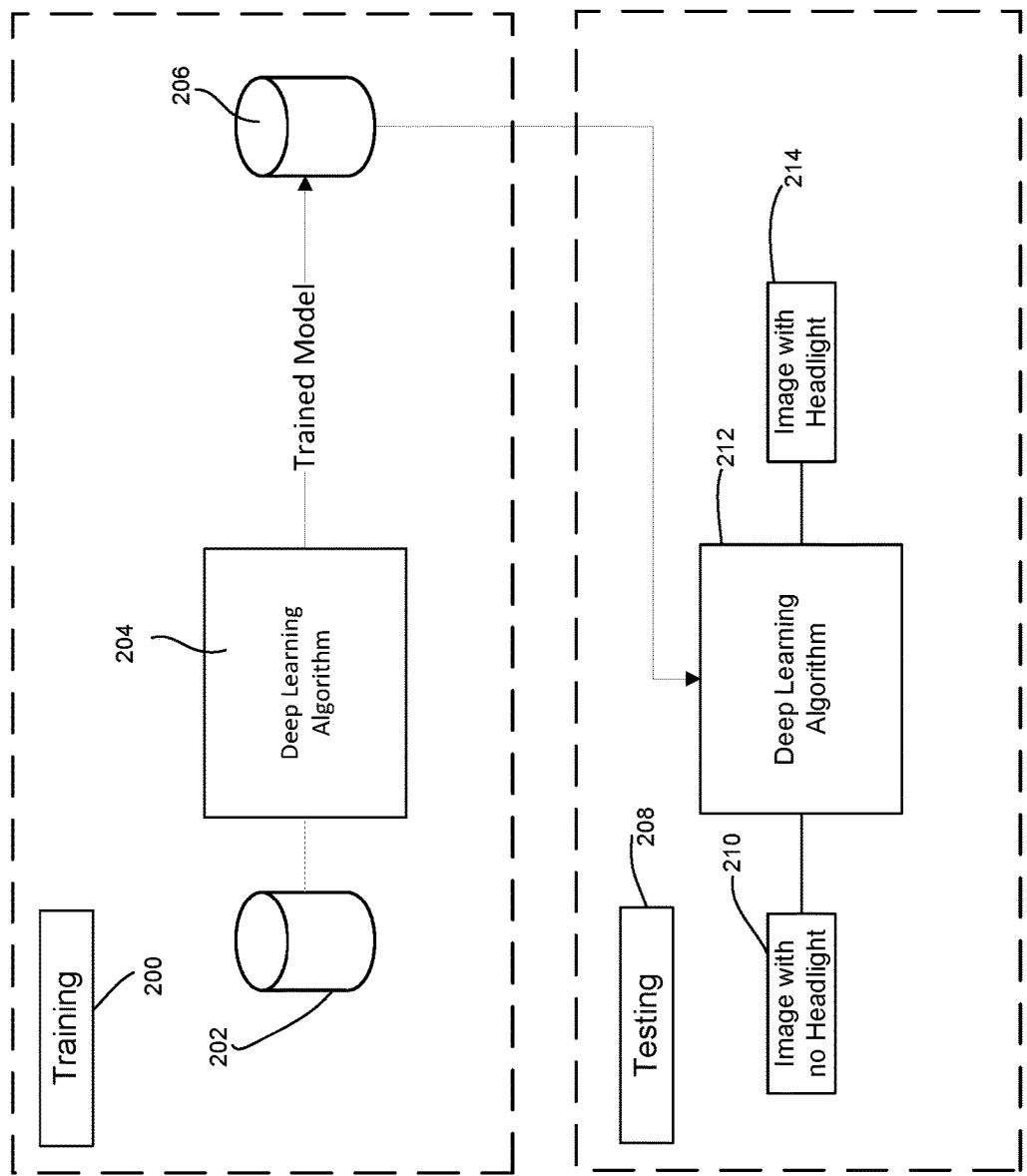
FIG. 2 is a schematic view of a testing system in accordance with the present invention.

The first part of the system is a training phase 200, where, such as shown in FIG. 2, the system trains a deep learning algorithm 204 (e.g., a neural network such as a GAN or a Convolution Neural Networks or other suitable Machine Learning algorithm) using a database 202 of video recordings or images. The video recordings include images of headlights and tail lights of different vehicles or target vehicles at different distances in different environmental and weather conditions, orientations, and angles of approach. For example, the database 202 may include a catalog of video recordings or images of various speeds, targets, and target orientations (including relevant data as to the distance and angle between the camera and the headlights/tail lights and relative speeds) along with accurate GPS data. The GPS information may be used to emulate the effect of various speeds and distances. The algorithm 204 outputs a trained model 206. The size of the dataset may be significantly smaller than the dataset that would be required to test the ADAS module via typical testing.

Optionally, the model may be trained with the same image multiple times emulating different conditions (e.g., by modifying the GPS data or other simulated sensor data). Optionally, the images may be perturbed or modified to enlarge the training set size without needing to acquire additional images. For example, images may be cropped, rotated, inverted, etc.

The second part of the system is the testing phase 208, where, the trained model 206 is provided to a deep learning algorithm or inference engine 212, which is provided a video recording 210 with no headlight or tail light (test images). The trained model 206, based on the training 200, modifies the test image or input image 210 to have a headlight or tail light 214. This modified image 214 is used for testing the ADAS module (e.g., a light detection module), thus generating a wide variety of test images for the ADAS module without the need to actually capture the images in the wide variety of environments necessary for adequate testing of the ADAS module.

Figure 3:
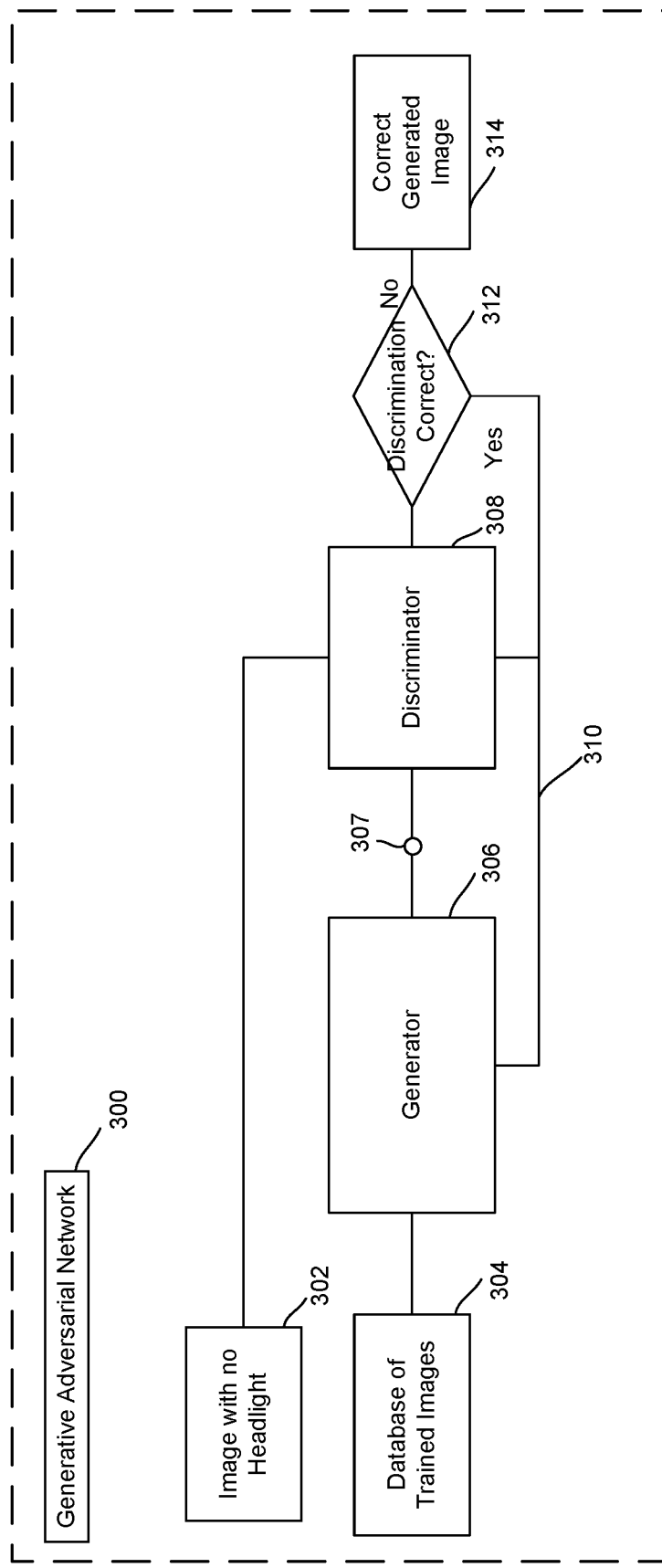
FIG. 3 is a schematic view of a generative adversarial network in accordance with the present invention.

Referring now to FIG. 3, the deep learning algorithm 212 of the testing phase or system 208 may include a deep neural network called a Generative Adversarial Network 300 (GAN) or a similar variant. The GAN comprises two sub networks—a generator or generative network 306 and a discriminator or discriminative network 308. The GAN 300 is initially trained using input images 302 (i.e., images with no headlight or tail light such as images 210) and output images 304 (i.e., a database of trained images such as database 202). The input and output images do not need to be in pairs for the initial training, nor do the images need pixel to pixel correspondence. The generator model (corresponding to the generator network 306) attempts to generate images 307 which look visually similar to the output of the physical imager (i.e., to generate images that do not include headlights or tail lights based on the trained images). The discriminator model (corresponding to the discriminator network 308) attempts to discriminate between the input images 302 and the generated images 307. This is an iterative process with the discriminator discriminating and providing feedback 310 to the generator and the generator producing images which look increasingly visually similar to that of an image from the physical sensor (i.e., to that of an image captured by a camera that includes a headlight or a taillight) until the discriminator is unable to distinguish between generated images and input images. That is, at step 312 the "No" path is followed for the correct generated image 314 (such as images 214) as the discriminator network 308 is unable to discriminate or determine which image is the test image and which image is the generated image (i.e., the generator has "fooled" the discriminator). At this point, training is complete and a stopping condition for the algorithm is generated. The correct generated image 314 may be provided to a suitable ADAS module (e.g., an automatic headlight control system) for testing. The ADAS module may, for example, classify the image 314 as a headlight or taillight and determine a position of the headlight or the taillight.

Thus, the system decreases training cost and provides unlimited test variations by modifying an image to add a headlight or taillight through the use of artificial intelligence (e.g., a neural network). The system is trained on a database of images that include a headlight or a taillight. Optionally, the training data includes GPS data to emulate the effect of various speeds and distances. The trained system may generate a modified image that includes a headlight or a taillight that may be used to train a corresponding ADAS module (such as an automatic headlight control system). The system allows the same video images to be used to test multiple different ADAS modules as the same or different neural networks can make different modifications to the same video images depending on the ADAS module under test.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for testing a vehicular driving assist system, the method comprising:
providing a neural network;
training the neural network using a database of images, wherein each image of the database comprises an image of a headlight of a vehicle or an image of a taillight of a vehicle;
providing to the trained neural network an input image that does not include a headlight or a taillight;
generating, by the neural network using the input image, an output image, wherein the output image comprises an image of a headlight generated by the neural network or an image of a taillight generated by the neural network; and
testing the vehicular driving assist system using the generated output image as an input to the vehicular driving assist system.

2. The method of claim 1, wherein the neural network comprises a generative adversarial network.

3. The method of claim 2, wherein training the neural network comprises iterating the training until a discriminator cannot distinguish between the input image and the generated output image.

4. The method of claim 1, wherein the vehicular driving assist system comprises an automatic headlight control system.

5. The method of claim 1, wherein the database comprises a plurality of video recordings.

6. The method of claim 5, wherein the plurality of video recordings comprises video recordings of a headlight or a taillight at at least one selected from the group consisting of (i) different speeds relative to a camera capturing the video recordings, (ii) different distances relative to the camera capturing the video recordings and (iii) different orientations relative to the camera capturing the video recordings.

7. The method of claim 1, wherein the vehicular driving assist system classifies the generated output image as including a headlight or a taillight and determines a position of the headlight or the taillight within the output image.

8. The method of claim 1, wherein the database comprises GPS data corresponding to the images.

9. The method of claim 8, wherein the GPS data emulates an effect of speed and distance experienced by a camera capturing the images.

10. The method of claim 1, wherein the neural network generates the output image by modifying the input image with the image of the headlight or the taillight.

11. A method for testing a vehicular driving assist system, the method comprising:
providing a generative adversarial network (GAN);
training the GAN using a database of video recordings, wherein each video recording of the database comprises a plurality of images that include a headlight of a vehicle or a taillight of a vehicle;
providing to the trained GAN an input image that does not include a headlight or a taillight;
generating, by the GAN using the input image, an output image, wherein the output image comprises an image of a headlight generated by the GAN or an image of a taillight generated by the GAN; and
testing the vehicular driving assist system using the generated output image as an input to the vehicular driving assist system.

12. The method of claim 11, wherein training the GAN comprises iterating the training until a discriminator cannot distinguish between the input image and the generated output image.

13. The method of claim 11, wherein the vehicular driving assist system comprises an automatic headlight control system.

14. The method of claim 11, wherein the database of video recordings comprises video recordings of a headlight or a taillight at at least one selected from the group consisting of (i) different speeds relative to a camera capturing the video recordings, (ii) different distances relative to the camera capturing the video recordings and (iii) different orientations relative to the camera capturing the video recordings.

15. The method of claim 11, wherein the vehicular driving assist system classifies the output image as including a headlight or a taillight and determines a position of the headlight or the taillight within the output image.

16. The method of claim 11, wherein the database comprises GPS data corresponding to the video recordings.

17. A method for testing an automatic headlight control system, the method comprising:
providing a neural network;

training the neural network using a database of images, wherein each image of the database comprises an image of a headlight of a vehicle or an image of a taillight of a vehicle;

providing to the trained neural network an input image that does not include a headlight or a taillight;

generating, by the neural network using the input image, an output image, wherein the output image comprises an image of a headlight generated by the neural network or an image of a taillight generated by the neural network;

testing the vehicular driving assist system using the generated output image as an input to the automatic headlight control system; and wherein the automatic headlight control system classifies the generated output image as including a headlight or a taillight and determines a position of the headlight or the taillight within the generated output image.

18. The method of claim 17, wherein the neural network comprises a generative adversarial network.

19. The method of claim 18, wherein training the neural network comprises iterating the training until a discriminator cannot distinguish between the input image and the generated output image.

20. The method of claim 17, wherein the database comprises a plurality of video recordings.

\* \* \* \* \*